(12) United States Patent
Kunz et al.

(10) Patent No.: US 6,733,847 B2
(45) Date of Patent: May 11, 2004

(54) PROCESS FOR THE PRODUCTION OF STRONGLY ADHERENT SURFACE-COATINGS BY PLASMA-ACTIVATED GRAFTING

(75) Inventors: Martin Kunz, Efringen-Kirchen (DE); Michael Bauer, Merzhausen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/181,008

(22) PCT Filed: Feb. 2, 2001

(86) PCT No.: PCT/EP01/01113

§ 371 (c)(1), (2), (4) Date: Jul. 11, 2002

(87) PCT Pub. No.: WO01/58971

PCT Pub. Date: Aug. 16, 2001

(65) Prior Publication Data

US 2003/0129322 A1 Jul. 10, 2003

(30) Foreign Application Priority Data

Feb. 8, 2000 (CH) ................................. 254/00

(51) Int. Cl.[7] .............................. B05D 3/02; B05D 3/06
(52) U.S. Cl. ...................... 427/533; 427/535; 427/536; 427/517; 427/407.1
(58) Field of Search .................. 427/407.1–412.5, 427/532–559, 517

(56) References Cited

U.S. PATENT DOCUMENTS 4,567,106 A   1/1986   Sano et al. ................ 428/413
5,053,246 A * 10/1991   Shuttleworth et al. ... 427/407.1

FOREIGN PATENT DOCUMENTS

| DE | 19720370 | * | 7/1998 |
| EP | 0487323 |  | 5/1992 |
| JP | 49-027530 | * | 3/1974 |
| JP | 11-156982 | * | 6/1999 |
| WO | WO 2000-24527 | * | 5/2000 |

* cited by examiner

Primary Examiner—Erma Cameron
(74) Attorney, Agent, or Firm—Kevin T. Mansfield

(57) ABSTRACT

The invention relates to a process for the production of strongly adherent coatings on an inorganic or organic substrate, in which process in a first step: a) the inorganic or organic substrate is subjected to the action of a low-temperature plasma discharge, a corona discharge, high-energy UV radiation or electron radiation, the radiation or discharge is then discontinued, in a further step: b) at least one electron- or H-donor, each containing at least one ethylenically unsaturated group, is applied to the inorganic or organic substrate in vacuo or at normal pressure and reacted with the free radicals formed there, and c1) the substrate so precoated with coinitiator is coated with a composition comprising at least one ethylenically unsaturated monomer or oligomer and a photoinitiator, and the coating is cured by means of electromagnetic and/or ionizing radiation; or c2) the substrate so precoated with coinitiator is coated with a composition comprising at least one ethylenically unsaturated monomer or oligomer and one or more thermally activatable initiators, and the coating is cured thermally. The invention relates also the use of electron- or H-donors, for example amines, thioethers or thiols, having at least one ethylenically unsaturated group in the production of such layers and to the strongly adherent coatings themselves.

16 Claims, No Drawings

PROCESS FOR THE PRODUCTION OF STRONGLY ADHERENT SURFACE-COATINGS BY PLASMA-ACTIVATED GRAFTING

This application is the National Stage of International Application No. PCT/EP01/01113, filed Feb. 2, 2001.

The invention relates to a process for the production of strongly adhering free-radical-curable coatings on inorganic or organic substrates by the deposition of electron- or H-donors having at least one ethylenically unsaturated group on a plasma-activated substrate. The invention relates also to the use of electron- or H-donors, for example amines, thioethers or thiols, having at least one ethylenically unsaturated group in the production of such layers and to the strongly adherent coatings themselves.

The adhesion of finishes, coatings or metallic layers on inorganic or organic substrates, especially on non-polar substrates such as polyethylene, polypropylene or fluorine-containing polyolefins, such as those known by the trade name Teflon®, is frequently inadequate, so that additional coating steps have to be taken in order to achieve satisfactory results. One possibility lies in first applying special priming coatings, so-called primers, and only then applying the desired coating thereto.

A further possibility lies in subjecting the substrates to be coated to a plasma or corona treatment and then coating them, it being possible for a grafting process with e.g. acrylate monomers to be carried out between those two operations (J. Polym. Sci., Part A: Polym. Chem. 31, 1307–1314 (1993)).

International Patent Application WO 00/24527 likewise describes a process for the production of strongly adherent coatings, in which in a first step the surface is pretreated, for example with a low-temperature plasma, and then a photoinitiator containing at least one ethylenically unsaturated bond is grafted onto the surface. The surface so pretreated is then provided with a UV-curable layer.

The production of low-temperature plasmas and the plasma-assisted deposition of thin organic or inorganic layers have been known for some time and are described, for example, by A. T. Bell, "Fundamentals of Plasma Chemistry" in "Technology and Application of Plasma Chemistry", published by J. R. Holahan and A. T. Bell, Wiley, New York (1974) or by H. Suhr, Plasma Chem. Plasma Process 3(1), 1, (1983).

It is also known that, for example, plastics surfaces can be subjected to a plasma treatment and as a result the subsequent finish exhibits improved adhesion to the plastics substrate. This is described by H. J. Jacobasch et al. in Farbe+Lack 99(7), 602–607 (1993) for low-temperature plasmas under vacuum conditions and by J. Friedrich et al. in Surf. Coat. Technol. 59, 371–6(1993) for plasmas ranging from in vacuo up to normal pressure conditions, the low-temperature plasma changing into a corona discharge over that range.

It has now been found that coatings having especially good adhesion can be achieved with free-radical-curable compositions by grafting onto the substrate to be coated at least one electron- or H-donor, e.g. a primary, secondary or tertiary amine, a thiol or a thioether or a mixture thereof, each having at least one ethylenically unsaturated group, then providing the substrate so grafted with a free-radical-curable composition which additionally comprises either a photoinitiator or a thermally activatable initiator, e.g. an organic peroxide, and curing that composition under the action of electromagnetic radiation (UV, visible or IR light) or the application of heat. The resulting coatings exhibit surprisingly good adhesion which does not suffer any appreciable impairment even after several days' storage in sunlight.

The process is simple to carry out and allows a high throughput per unit of time, since lengthy drying steps and slow crosslinking reactions are not required. The process is especially well suited to workpieces that are composed of different plastics and/or metals or types of glass and that without the pretreatment would therefore exhibit different degrees of adhesion to the different components or that in the case of a conventional primer treatment exhibit different affinities for the primer.

The improvement in adhesion can be extraordinarily great, since a covalent bond to the substrate can be formed. The substrate suffers virtually no temperature-related damage, since the process can be carried out in such a manner that the temperatures that occur are at most briefly slightly higher than room temperature. Since the first process step is preferably carried out in vacuo, even substrates on which extraordinarily high purity demands are made can be so treated. Examples thereof can be found in the field of electronics, medicine and food packaging.

In principle, areas that are structured imagewise can also be rendered strongly adherent by the process, for example by pretreating the substrate with the plasma through a mask and thus modifying only certain areas. Structuring can also be carried out subsequently, however, if the free-radical-curable composition contains a photoinitiator and the irradiation is carried out e.g. through a mask.

The invention relates to a process for the production of strongly adherent coatings on an inorganic or organic substrate, in which process in a first step a) the inorganic or organic substrate is subjected to the action of a low-temperature plasma discharge, a corona discharge, high-energy UV radiation or electron radiation, the radiation or discharge is then discontinued, in a further step b) at least one electron- or H-donor, each containing at least one ethylenically unsaturated group, is applied to the inorganic or organic substrate in vacuo or at normal pressure and reacted with the free radicals formed there, and c1) the substrate so precoated with coinitiator is coated with a composition comprising at least one ethylenically unsaturated monomer or oligomer and a photoinitiator, and the coating is cured by means of electromagnetic and/or ionising radiation; or c2) the substrate so precoated with coinitiator is coated with a composition comprising at least one ethylenically unsaturated monomer or oligomer and one or more thermally activatable initiators, and the coating is cured thermally.

Possible ways of obtaining plasmas under vacuum conditions have been described frequently in the literature. The electrical energy can be coupled in by inductive or capacitive means. It may be direct current or alternating current; the frequency of the alternating current may vary from a few kHz up into the MHz range. A power supply in the microwave range (GHz) is also possible.

The principles of plasma production and maintenance are described, for example, in the review articles of A. T. Bell and H. Suhr mentioned above.

As primary plasma gases it is possible to use, for example, He, argon, xenon, $N_2$, $O_2$, $CO_2$, NO, steam or air.

The process according to the invention is not sensitive per se in respect of the coupling-in of the electrical energy.

The process can be carried out batchwise, for example in a rotating drum, or continuously in the case of films, fibres or woven fabrics. Those processes are known and are described in the prior art.

The process can also be carried out under corona discharge conditions. Corona discharges are produced under normal pressure conditions, the ionised gas used most frequently being air. In principle, however, other gases are also possible, in which case the operation should be carried out in a closed system in order to exclude atmospheric air. Another possibility is to use air as ionisation gas in corona discharges, so that the operation can be carried out in an apparatus open to the outside and, for example, a film can be drawn through continuously between the discharge electrodes. Such process arrangements are known and are described, for example, in J. Adhesion Sci. Technol. Vol 7, No. 10, 1091–1127, (1993).

When a corona discharge in an open apparatus is used, it is preferable to carry out the operation with the exclusion of oxygen, which can be achieved by a sufficiently large flow of inert gas.

The process can also be carried out using high-energy electromagnetic radiation for the treatment of substrates in vacuo or with the exclusion of oxygen. High-energy electromagnetic radiation that comes into consideration is radiation that is capable of generating free radicals on the surface. Examples thereof are short-wave UV radiation or X-rays. In this context, special mention should be made of electron beams, such as are already used in the curing of surface-coatings and paints and the adhesive bonding of films. It is also possible, however, to use short-wave UV radiation (especially vacuum UV radiation), such as that produced by commercially available UV lamps or by excimer lamps. Radiation having a wavelength of less than 300 nm, especially less than 260 nm, is preferred. In addition to conventional lamps for irradiating a large area, it is also possible to use lasers operating in a corresponding wavelength range for pointwise irradiation or for image-forming "writing" of the surface. When masks or writing lasers are used it is also possible for only certain areas to be loaded selectively with the graft molecules, which leads to different degrees of wetting and, in a subsequent coating, to different degrees of adhesion.

The inorganic or organic substrate to be treated may be in any solid form. The substrate is preferably in the form of a powder, a fibre, a film or a three-dimensional workpiece.

The inorganic or organic substrate is preferably a thermoplastic, elastomeric, structurally crosslinked or crosslinked polymer, a metal oxide, a glass or a metal.

Examples of thermoplastic, elastomeric, structurally crosslinked or crosslinked polymers are listed below.

1. Polymers of mono- and di-olefins, for example polypropylene, polyisobutylene, polybutene-1, poly-4-methylpentene-1, polyisoprene or polybutadiene and also polymerisates of cyclo-olefins, for example of cyclopentene or norbornene; and also polyethylene (which may optionally be cross-linked), for example high density polyethylene (HDPE), high density polyethylene of high molecular weight (HDPE-HMW), high density polyethylene of ultra-high molecular weight (HDPE-UHMW), medium density polyethylene (MDPE), low density polyethylene (LDPE), and linear low density polyethylene (LLDPE), (VLDPE) and (ULDPE).

Polyolefins, that is to say polymers of mono-olefins, as mentioned by way of example in the preceding paragraph, especially polyethylene and polypropylene, can be prepared by various processes, especially by the following methods:
a) by free radical polymerisation (usually at high pressure and high temperature);
b) by means of a catalyst, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either π- or σ-coordinated. Such metal complexes may be free or fixed to carriers, for example to activated magnesium chloride, titanium(III) chloride, aluminium oxide or silicon oxide. Such catalysts may be soluble or insoluble in the polymerisation medium. The catalysts can be active as such in the polymerisation or further activators may be used, for example metal alkyls, metal hydrides, metal alkyl halides, metal alkyl oxides or metal alkyl oxanes, the metals being elements of group(s) Ia, IIa and/or IIIa. The activators may be modified, for example, with further ester, ether, amine or silyl ether groups. Those catalyst systems are usually known as Phillips, Standard Oil Indiana, Ziegler (-Natta), TNZ (DuPont), metallocene or Single Site Catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, for example ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers. ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or randomly structured polyalkylene-carbon monoxide copolymers and mixtures thereof with other polymers, for example polyamides.

4. Hydrocarbon resins (for example $C_5$–$C_9$) including hydrogenated modifications thereof (for example tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate and methacrylate, styrene/maleic acid anhydride, styrene/acrylonitrile/methyl acrylate; high-impact-strength mixtures consisting of styrene copolymers and another polymer, for example a polyacrylate, a diene polymer or an ethylene/propylene/diene terpolymer; and also block copolymers of styrene, for example styrene/butadiene/styrene, styrene/isoprene/styrene, styrene/ethylene-butylene/styrene or styrene/ethylene-propylene/styrene.

7. Graft copolymers of styrene or α-methylstyrene, for example styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic acid anhydride on polybutadiene; styrene, acrylonitrile and maleic acid anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA or AES polymers.

8. Halogen-containing polymers, for example polychloroprene, chlorinated rubber, chlorinated and brominated copolymer of isobutylene/isoprene (halobutyl rubber), chlorinated or chlorosulfonated polyethylene, copolymers of ethylene and chlorinated ethylene, epichlorohydrin homo- and co-polymers, especially polymers of halogen-containing vinyl compounds, for example polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from α, β-unsaturated acids and derivatives thereof, such as polyacrylates and polymethacrylates, or polymethyl methacrylates, polyacrylamides and polyacrylonitriles impact-resistant-modified with butyl acrylate.

10. Copolymers of the monomers mentioned under 9) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

12. Homo- and co-polymers of cyclic ethers, such as polyalkylene glycols, polyethylene oxide, polypropylene oxide or copolymers thereof with bisglycidyl ethers.

13. Polyacetals, such as polyoxymethylene, and also those polyoxymethylenes which contain comonomers, for example ethylene oxide; polyacetals that are modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes having terminal hydroxyl groups on the one hand and aliphatic or aromatic polyisocyanates on the other hand, and their initial products.

16. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides derived from m-xylene, diamine and adipic acid; polyamides prepared from hexamethylenediamine and iso- and/or tere-phthalic acid and optionally an elastomer as modifier, for example poly-2,4, 4-trimethylhexamethylene terephthalamide or poly-m-phenylene isophthalamide. Block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol. Also polyamides or copolyamides modified with EPDM or ABS; and polyamides condensed during processing ("RIM polyamide systems").

17. Polyureas, polyimides, polyamide imides, polyether imides, polyester imides, polyhydantoins and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether esters derived from polyethers with hydroxyl terminal groups; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenol-formaldehyde, urea-formaldehyde and melamine-formaldehyde resins.

22. Drying and non-drying alkyd resins.

23. Unsaturated polyester resins derived from copolyesters of saturated and unsaturated dicarboxylic acids with polyhydric alcohols, and also vinyl compounds as crosslinking agents, and also the halogen-containing, difficultly combustible modifications thereof.

24. Crosslinkable acrylic resins derived from substituted acrylic acid esters, e.g. from epoxy acrylates, urethane acrylates or polyester acrylates.

25. Alkyd resins, polyester resins and acrylate resins that are crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of bisphenol-A diglycidyl ethers, bisphenol-F diglycidyl ethers, that are crosslinked using customary hardeners, e.g. anhydrides or amines with or without accelerators.

27. Natural polymers, such as cellulose, natural rubber, gelatin, or polymer-homologously chemically modified derivatives thereof, such as cellulose acetates, propionates and butyrates, and the cellulose ethers, such as methyl cellulose; and also colophonium resins and derivatives.

28. Mixtures (polyblends) of the afore-mentioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Within the context of the present invention, paper should also be understood as being an structurally crosslinked polymer, especially in the form of cardboard, which can additionally be coated with e.g. Teflon®. Such substrates are, for example, commercially available.

The thermoplastic, crosslinked or structurally crosslinked plastics is preferably a polyolefin, polyamide, polyimide, polyacrylate, polycarbonate, polystyrene or an acrylic/melamine, alkyd or polyurethane surface-coating.

Polycarbonate, polyethylene, polypropylene, polyamide and polyimide are especially preferred. The plastics may be in the form of films, injection-moulded articles, extruded workpieces, fibres, felts or woven fabrics.

As inorganic substrates there come into consideration especially glass, metal oxides and metals. They may be silicates and semi-metal or metal oxide glass which are preferably in the form of powder having average particle diameters of from 10 nm to 2000 μm. The particles may be solid or porous. Examples of oxides and silicates are $SiO_2$, $TiO_2$, $ZrO_2$, MgO, NiO, $WO_3$, $Al_2O_3$, $La_2O_3$, silica gels, clays and zeolites. Preferred inorganic substrates, in addition to metals, are silica gels, aluminium oxide, titanium oxide and glass and mixtures thereof.

As metal substrates there come into consideration especially Fe, Al, Ti, Ni, Mo, Cr and steel alloys.

The electron- or H-donor is preferably a primary, secondary or tertiary amine, a thiol or a thioether or a mixture thereof.

In principle, any amine, thiol or thioether that contains at least one ethylenically unsaturated group is suitable for use in the process according to the invention.

Amines, especially secondary or tertiary amines, are preferred. Also preferred are aliphatic or cycloaliphatic amines that, in addition to the amine nitrogen atom, may also contain further hetero atoms. Examples are derivatives of piperidine, morpholine or piperazine.

Oligomeric amines are also possible.

Special preference is given to compounds of formulae Ia, Ib, Ic, Id and Ie

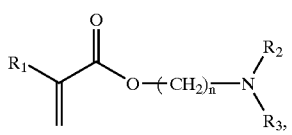
(Ia)

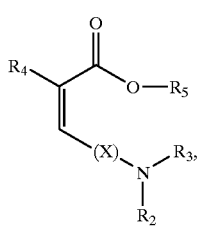
(Ib)

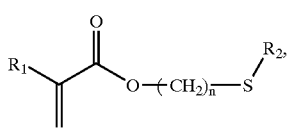
(Ic)

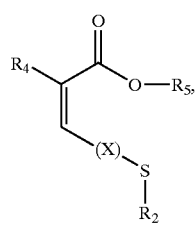
(Id)

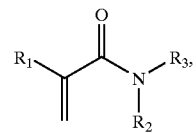
(Ie)

wherein
$R_1$ is H or $C_1$–$C_4$alkyl; preferably H or $CH_3$;
$R_2$ and $R_3$ are each independently of the other $C_1$–$C_{18}$alkyl or, in formulae Ia, Ib and Ie, together with the nitrogen atom to which they are bonded form a 5- or 6-membered cycloaliphatic ring which may additionally be interrupted by a nitrogen or oxygen atom; or $R_2$ in formula Ic has the additional meaning of the group

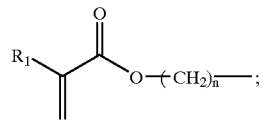

$R_4$ is $C_1$–$C_{18}$alkyl, phenyl, phenyl-$C_1$–$C_3$alkyl or a group —C(O)—$C_1$–$C_{18}$alkyl or —C(O)—$(CH_2)_a$-phenyl wherein a is a number from 0 to 3;

$R_5$ is $C_1$–$C_{18}$alkyl, phenyl or phenyl-$C_1$–$C_3$alkyl;

X is a direct bond, a group —$(CH_2)_n$— or a branched $C_3$–$C_{18}$alkylene group; and n is a number from 1 to 12.

Preferably $R_2$ and $R_3$ are $C_1$–$C_4$alkyl or together with the nitrogen atom to which they are bonded form a morpholine radical.

Preferably $R_4$ is $C_1$–$C_4$alkyl or benzyl. $R_5$ is preferably $C_1$–$C_4$alkyl and n is preferably from 1 to 4.

The meanings of the substituents in the different radicals are explained below.

$C_1$–$C_{18}$Alkyl is linear or branched and is, for example, $C_1$–$C_8$-, $C_1$–$C_6$- or $C_1$–$C_4$-alkyl.

Examples are methyl, ethyl, propyl, isopropyl, n-butyl, sec-butyl, iso-butyl, tert-butyl, pentyl, hexyl, heptyl, 2,4,4-trimethyl-pentyl, 2-ethylhexyl, octyl, nonyl, decyl, undecyl, dodecyl and octadecyl, especially e.g. methyl or butyl.

Phenylalkyl is phenylpropyl, phenylethyl and especially benzyl.

When $R_2$ and $R_3$ together with the nitrogen atom form a 5- or 6-membered cycloaliphatic ring which may additionally be interrupted by a nitrogen or oxygen atom, they form, for example, cyclopentyl, cyclohexyl, pyrrolidine, morpholine, pyrazoline, pyrazolidone, imidazoline, imidazolidine, oxazolidine, oxazolidinone, piperidine, piperazine or piperazinone.

The compounds of formulae Ia to Ie are mostly known and are commercially available or can be prepared in accordance with analogy processes.

Suitable compounds are also amine-group-containing or thio-group-containing vinyl ethers or styrenes. Examples are given below:

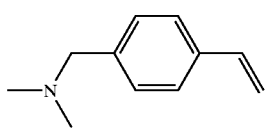

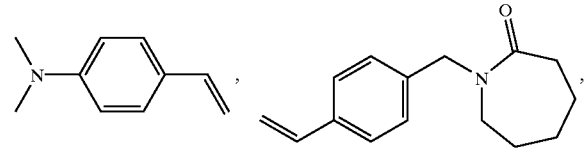

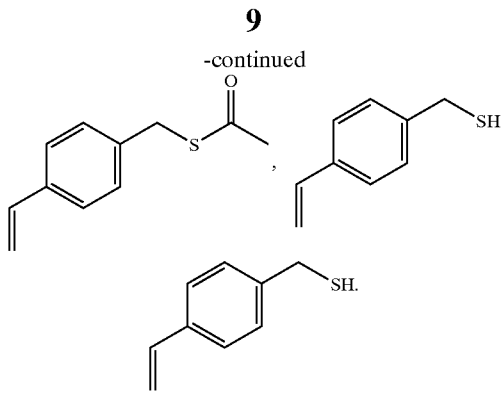

Specific examples of suitable ethylenically unsaturated amines, thiols and thioethers are given below.

2-N-Morpholinoethyl acrylate, 2-N-morpholinoethyl methacrylate, N,N-diethylaminoethyl acrylate, N,N-dimethylaminoethyl acrylate, 3-(dimethylamino)propyl acrylate, 2-(diethylamino)ethyl methacrylate, 2-(dimethylamino)ethyl methacrylate, 3-(dimethylamino) neopentyl acrylate, 2-(tert-butylamino)ethyl methacrylate, 2-(diisopropylamino)ethyl methacrylate, 2-aminoethyl methacrylate hydrochloride, methyl-3-(dimethylamino)-2-(2,2-dimethylpropanoyl) acrylate, ethyl-3-dimethylaminoacrylate, benzyl-2-(diphenylmethylaminomethyl) acrylate hydrobromide, 2-dimethylamino-1-benzamido-methyl acrylate, 3-(dimethylamino)propyl acrylate, 3-amino-3-(trifluoromethylphenylamino)ethyl acrylate hydrochloride, 2-((2-acetyl-3-oxo-1-butenyl)amino)-3-(dimethylamino) methyl acrylate, ethylthioethyl methacrylate, thioldiethylene glycol diacrylate, 2-(methylthio)ethyl methacrylate and methyl-2-methylthioacrylate.

Also suitable are dimethyl-bis(methylthio)methylene malonate, N-vinylpyrrolidone, N,N-diethyl-2-ethylvinyl ether.

Those compounds are all known and are commercially available. Furthermore, suitable amines are provided by a number of manufacturers under their trade names and these too can be used in the context of the present invention. Examples are mentioned below. From UCB SA Ebecryl® P 115 and Ebecryl® 7100. From Cray Valley CN 371, CN 383, CN 384, CN 381, CN 386. From Rahn Genomer® 5248, Genomer®5275, Genomer®5695, ACMO (acryloylmorpholine). From Akcros Chemicals Actilan® 705, 715, 725, 735, 745. From CPS Chemical Company Ageflex® FH 1, FH 2, FU 1, FU 2, FU 4. From Cognis Photomer 4770, Photomer 4967, RCC 13-660, RCC 13-661. From BASF Laromer LR 8956.

The electron- or H-donors, for example the amines, thiols and thioethers, containing at least one ethylenically unsaturated group can be vaporised, for example, on a heatable device in vacuo after the free-radical-forming discharge or irradiation (Process step a)) has been discontinued, so that they are deposited on the workpiece being treated, where they react with free radical sites. The vaporisation can be effected in the form of a solid, a melt or with a suitable solvent, the vapour pressure of the solvent preferably being close to that of the electron- or H-donors. Other methods of application, e.g. pouring, immersion, spraying, spreading, knife application, roller application, spin-coating or electrophoretic deposition, are also possible, however.

In the case of a corona discharge under atmospheric conditions, the electron- or H-donors having at least one ethylenically unsaturated group can also be applied from a solution by spraying. This is preferably effected as soon as possible after the corona discharge, for example in a continuous process by means of nozzles downstream of the discharge zone.

In a further embodiment of the process, in Process step b) together with the electron- or H-donors having at least one ethylenically unsaturated group there is simultaneously applied a photoinitiator and/or an ethylenically unsaturated monomer.

Examples of suitable photoinitiators and monomers are given below.

The ratio of electron- or H-donors to photoinitiator and/or monomer is preferably from 10:1 to 1:2.

After the application of the compounds, the workpiece can be stored or immediately processed further, a free-radical-curable composition containing ethylenically unsaturated bonds being applied by means of known technology. This can be effected by means of pouring, immersion, spraying, spreading, knife application, roller application or spin-coating. Electrophoretic deposition is also possible.

The unsaturated compounds of the free-radical-curable composition may contain one or more ethylenically unsaturated double bonds. They may be low molecular weight (monomeric) or higher molecular weight (oligomeric). Examples of monomers having a double bond are alkyl and hydroxyalkyl acrylates and methacrylates, e.g. methyl, ethyl, butyl, 2-ethylhexyl and 2-hydroxyethyl acrylate, isobornyl acrylate and methyl and ethyl methacrylate. Also of interest are silicone acrylates. Further examples are acrylonitrile, acrylamide, methacrylamide, N-substituted (meth)acrylamides, vinyl esters, such as vinyl acetate, vinyl ethers, such as isobutyl vinyl ether, styrene, alkyl- and halo-styrenes, N-vinylpyrrolidone, vinyl chloride and vinylidene chloride.

Examples of monomers having several double bonds are ethylene glycol diacrylate, propylene glycol diacrylate, neopentyl glycol diacrylate, hexamethylene glycol diacrylate, bisphenol-A diacrylate, 4,4'-bis(2-acryloyloxyethoxy) diphenylpropane, trimethylolpropane triacrylate, pentaerythritol triacrylate, pentaerythritol tetraacrylate, vinyl acrylate, divinylbenzene, divinyl succinate, diallyl phthalate, triallyl phosphate, triallyl isocyanurate, tris (hydroxyethyl) isocyanurate triacrylate and tris(2-acryloylethyl) isocyanurate.

Examples of higher molecular weight (oligomeric) polyunsaturated compounds are acrylated epoxy resins, acrylated or vinyl-ether- or epoxy-group-containing polyesters, polyurethanes and polyethers. Further examples of unsaturated oligomers are unsaturated polyester resins, which are usually produced from maleic acid, phthalic acid and one or more diols and have molecular weights of about from 500 to 3000. In addition it is also possible to use vinyl ether monomers and oligomers, and also maleate-terminated oligomers having polyester, polyurethane, polyether, polyvinyl ether and epoxide main chains. In particular, combinations of vinyl-ether-group-carrying oligomers and polymers, as described in WO 90/01512, are very suitable, but copolymers of monomers functionalised with vinyl ether and maleic acid also come into consideration. Such unsaturated oligomers can also be termed prepolymers.

Especially suitable are, for example, esters of ethylenically unsaturated carboxylic acids and polyols or polyepoxides, and polymers having ethylenically unsaturated groups in the chain or in side groups, e.g. unsaturated polyesters, polyamides and polyurethanes and copolymers thereof, alkyd resins, polybutadiene and butadiene copolymers, polyisoprene and isoprene copolymers, polymers and copolymers having (meth)acrylic groups in side chains, and also mixtures of one or more such polymers.

Examples of unsaturated carboxylic acids are acrylic acid, methacrylic acid, crotonic acid, itaconic acid, cinnamic acid and unsaturated fatty acids such as linolenic acid or oleic acid. Acrylic and methacrylic acid are preferred.

Suitable polyols are aromatic and especially aliphatic and cycloaliphatic polyols. Examples of aromatic polyols are hydroquinone, 4,4'-dihydroxydiphenyl, 2,2-di(4-hydroxyphenyl)propane, and novolaks and resols. Examples of polyepoxides are those based on the said polyols, especially the aromatic polyols and epichlorohydrin. Also suitable as polyols are polymers and copolymers that contain hydroxyl groups in the polymer chain or in side groups, e.g. polyvinyl alcohol and copolymers thereof or polymethacrylic acid hydroxyalkyl esters or copolymers thereof. Further suitable polyols are oligoesters having hydroxyl terminal groups.

Examples of aliphatic and cycloaliphatic polyols include alkylenediols having preferably from 2 to 12 carbon atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris($\beta$-hydroxyethyl)amine, trimethylolethane, trimethylolpropane, pentaerythritol, dipentaerythritol and sorbitol.

The polyols may be partially or fully esterified by one or by different unsaturated carboxylic acid(s), it being possible for the free hydroxyl groups in partial esters to have been modified, for example etherified, or esterified by other carboxylic acids.

Examples of esters are:
trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentaacrylate, sorbitol hexaacrylate, oligoester acrylates and methacrylates, glycerol di- and tri-acrylate, 1,4-cyclohexane diacrylate, bisacrylates and bismethacrylates of polyethylene glycol having a molecular weight of from 200 to 1500, and mixtures thereof.

Also suitable as a component are the amides of identical or different unsaturated carboxylic acids and aromatic, cycloaliphatic and aliphatic polyamines having preferably from 2 to 6, especially from 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diamino-cyclohexane, isophoronediamine, phenylenediamine, bisphenylenediamine, di-$\beta$-aminoethyl ether, diethylenetriamine, triethylenetetramine and di($\beta$-aminoethoxy)- and di($\beta$-aminopropoxy)-ethane. Further suitable polyamines are polymers and copolymers which may have additional amino groups in the side chain and oligoamides having amino terminal groups. Examples of such unsaturated amides are: methylene bisacrylamide, 1,6-hexamethylene bisacrylamide, diethylenetriamine trismethacrylamide, bis(methacrylamidopropoxy)ethane, $\beta$-methacrylamidoethyl methacrylate and N-[($\beta$-hydroxyethoxy)ethyl]-acrylamide.

Suitable unsaturated polyesters and polyamides are derived, for example, from maleic acid and diols or diamines. The maleic acid may have been partially replaced by other dicarboxylic acids. They may be used together with ethylenically unsaturated comonomers, e.g. styrene. The polyesters and polyamides may also be derived from dicarboxylic acids and ethylenically unsaturated diols or diamines, especially from those having longer chains of e.g. from 6 to 20 carbon atoms. Examples of polyurethanes are those composed of saturated diisocyanates and unsaturated diols or unsaturated diisocyanates and saturated diols.

Polybutadiene and polyisoprene and copolymers thereof are known. Suitable comonomers include, for example, olefins, such as ethylene, propene, butene, hexene, (meth) acrylates, acrylonitrile, styrene and vinyl chloride. Polymers having (meth)acrylate groups in the side chain are likewise known. Examples are reaction products of novolak-based epoxy resins with (meth)acrylic acid; homo- or co-polymers of vinyl alcohol or hydroxyalkyl derivatives thereof that have been esterified with (meth)acrylic acid; and homo- and co-polymers of (meth)acrylates that have been esterified with hydroxyalkyl (meth)acrylates.

It is especially preferred to use an acrylate or methacrylate compound as ethylenically mono- or poly-unsaturated compound.

Very especially preferred are polyunsaturated acrylate compounds, as already listed above.

Special preference is given to a process in which at least one of the ethylenically unsaturated monomers or oligomers of the composition is a mono-, di-, tri- or tetra-functional acrylate or methacrylate.

The composition can be cured thermally in the presence of a thermally activatable initiator. Suitable initiators, e.g. peroxides or azo compounds, are known to the person skilled in the art and are commercially available.

Examples of suitable peroxides are:
acetyl-cyclohexanesulfonyl peroxide, diisopropyl peroxydicarbonate, tert-amyl perneodecanoate, tert-butyl perneodecanoate, tert-butyl perpivalate, tert-amyl perpivalate, bis(2,4-dichlorobenzoyl)peroxide, diisononanoyl peroxide, didecanoyl peroxide, dioctanoyl peroxide, dilauroyl peroxide, bis(2-methylbenzoyl) peroxide, disuccinic acid peroxides, diacetyl peroxide, dibenzoyl peroxide, tert-butyl per-2-ethylhexanoate, bis(4-chlorobenzoyl)peroxide, tert-butyl perisobutyrate, tert-butyl permaleinate, 1,1-bis(tert-butylperoxy)-3,5,5-trimethyl-cyclohexane, 1,1-bis(tert-butylperoxy)cyclohexane, tert-butyl-peroxyisopropyl carbonate, tert-butyl perisononanoate, 2,5-dimethylhexane-2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxides, 2,5-dimethylhexane-2,5-di-tert-butyl peroxide, 3-tert-butylperoxy-3-phenylphthalide, di-tert-amyl peroxide, $\alpha,\alpha'$-bis(tert-butylperoxy-isopropyl)-benzene, 3,5-bis(tert-butylperoxy)-3,5-dimethyl-1,2-dioxolane, di-tert-butyl peroxides, 2,5-dimethylhexyne-2,5-di-tert-butyl peroxides, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide and tert-butyl hydroperoxide.

Examples of suitable azo componds are: azoisobutyronitrile (AIBN), and the products marketed by DuPont under the name Vazo®.

The composition can also be cured by UV/VIS/IR radiation in the presence of a photoinitiator. Such curing is preferred, but electron beam curing is also possible.

In the context of the present invention, UV/VIS radiation is to be understood as being electromagnetic radiation in a wavelength range of from 100 nm to 1200 nm. Preference is given to the range from 200 nm to 600 nm, especially from 300 nm to 600 nm. Suitable radiation sources are known to the person skilled in the art and are commercially available.

The photosensitivity of the compositions usually extends from approximately 200 nm to approximately 600 nm (UV field). Suitable radiation is present, for example, in sunlight or light from artificial light sources. Accordingly a large number of the most varied kinds of light source may be used. Both point sources and planiform radiators (lamp carpets) are suitable. Examples are: carbon arc lamps, xenon arc lamps, medium-pressure, high-pressure and low-pressure mercury arc radiators doped, where appropriate, with metal halides (metal halide lamps), microwave-excited metal vapour lamps, excimer lamps, superactinic fluorescent tubes, fluorescent lamps, argon incandescent lamps, electronic flash lamps, photographic floodlight lamps and light-emitting diodes (LED). The distance between the lamp and the substrate to be irradiated may vary according to the intended use and the type and strength of the lamp and may be, for example, from 2 cm to 150 cm. Especially suitable are laser light sources, for example excimer lasers, such as Krypton-F lasers for irradiation at 248 nm. Lasers in the visible range may also be used.

The free-radical-curable composition preferably comprises at least one ethylenically unsaturated monomer or oligomer and at least one photoinitiator and is cured by UV/VIS radiation.

As photoinitiators in the radiation-curable surface-coatings it is possible to use any initiators known from the prior art. Such photoinitiators can also, as described above, be vaporised in Process step b).

They are especially aromatic carbonyl compounds, e.g. benzophenone and derivatives, acetophenone and derivatives thereof, acylphosphine oxides, bisacylphosphine oxides, thioxanthone, especially also isopropyl thioxanthone, anthraquinone derivatives and 3-acylcoumarin derivatives, terphenyls, styryl ketones, and also 3-(aroylmethylene)-thiazolines, camphor quinone, and also eosine, rhodamine and erythrosine dyes. It is also possible to use hexaarylbisimidazoles (EP-A-475 153), acridines (U.S. Pat. No. 5,334,484) and dye borate salts and combinations of dyes with borates (U.S. Pat. Nos. 4,772,541 and 5,932,393).

Typical examples are mentioned below, which can be used both on their own or in admixture with one another. For example, benzophenones, benzophenone derivatives, acetophenone, acetophenone derivatives, e.g. α-hydroxycycloalkylphenylketones or 2-hydroxy-2-methyl-1-phenyl-propanone, dialkoxyacetophenones, α-hydroxy- or α-amino-acetophenones, e.g. (4-methylthiobenzoyl)-1-methyl-1-morpholino-ethane, (4-morpholino-benzoyl)-1-benzyl-1-dimethylamino-propane, 4-aroyl-1,3-dioxolanes, benzoin alkyl ethers and benzil ketals, e.g. benzil dimethyl ketal, phenyl glyoxalates and derivatives thereof, dimeric phenyl glyoxalates, monoacylphosphine oxides, e.g. (2,4,6-trimethylbenzoyl)phenylphosphine oxide, bisacylphosphine oxides, e.g. bis(2,6-dimethoxybenzoyl)-(2,4,4-trimethyl-pent-1-yl)phosphine oxide, bis(2,4,6-trimethylbenzoyl) phenylphosphine oxide or bis(2,4,6-trimethylbenzoyl)-(2,4-dipentyloxyphenyl)phosphine oxide, trisacylphosphine oxides, ferrocenium compounds or titanocenes, e.g. dicyclopentadienyl-bis(2,6-difluoro-3-pyrrolo-phenyl) titanium. A further class of suitable photoinitiators is that of the oxime esters. The following compounds may be mentioned by way of example: 1-(4-phenylsulfanyl-phenyl)-butane-1,2-dione 2-oxime-O-benzoate, 1-(4-phenylsulfanyl-phenyl)-octane-1,2-dione 2-oxime-O-benzoate, 1-(4-phenyl-sulfanyl-phenyl)-octan-1-one oxime-O-acetate, 1-(4-phenylsulfanyl-phenyl)-butan-1-one oxime-O-acetate and 1-(4-phenylsulfanyl-phenyl)-octane-1,2-dione 2-oxime-O-benzoate.

Further examples of suitable photoinitiators and sensitisers are listed below.

1. Thioxanthones

Thioxanthone, 2-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)-thioxanthone, 4-butoxycarbonyl-thioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxy-carbonyl-3-aminothioxanthone, 1-ethoxycarbonyl-3-phenylsulfurylthioxanthone, 3,4-di[2-(2-methoxyethoxy) ethoxycarbonyl]thioxanthone, 1-ethoxycarbonyl-3-(1-methyl-1-morpholino-ethyl)-thioxanthone, 2-methyl-6-dimethoxymethyl-thioxanthone, 2-methyl-6-(1,1-dimethoxy-benzyl)-thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-polyethylene glycol ester, 2-hydroxy-3-(3,4-dimethyl-9-oxo-9H-thioxanthon-2-yloxy)-N,N,N-trimethyl-1-propanaminium chloride;

2. Benzophenones

Benzophenone, 4-phenylbenzophenone, 4-methoxybenzophenone, 4,4'-dimethoxy-benzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)-benzophenone, 3,3'-dimethyl-4-methoxybenzophenone, methyl-2-benzoyl benzoate, 4-(2-hydroxyethylthio)-benzophenone, 4-(4-tolylthio)benzophenone, 4-benzoyl-N, N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)-benzophenone, 4-benzoyl-N,N-dimethyl-N-[2-(1-oxo-2-propenyl)oxy]ethyl-benzenemethanaminium chloride; and also asymmetrically substituted benzophenone derivatives, as described in WO 98/33764;

3. 3-Acylcoumarins

3-Benzoylcoumarin, 3-benzoyl-7-methoxycoumarin, 3-benzoyl-5,7-di(propoxy)coumarin, 3-benzoyl-6,8-dichlorocoumarin, 3-benzoyl-6-chlorocoumarin, 3,3'-carbonyl-bis[5,7-di-(propoxy)coumarin], 3,3'-carbonyl-bis(7-methoxycoumarin), 3,3'-carbonyl-bis(7-diethylaminocoumarin), 3-isobutyroylcoumarin, 3-benzoyl-5,7-dimethoxycoumarin, 3-benzoyl-5,7-diethoxycoumarin, 3-benzoyl-5,7-dibutoxycoumarin, 3-benzoyl-5,7-di(methoxyethoxy)coumarin, 3-benzoyl-5,7-di(allyloxy)coumarin, 3-benzoyl-7-dimethylaminocoumarin, 3-benzoyl-7-diethylaminocoumarin, 3-isobutyroyl-7-dimethylaminocoumarin, 5,7-dimethoxy-3-(1-naphthoyl)-coumarin, 5,7-dimethoxy-3-(1-naphthoyl)-coumarin, 3-benzoylbenzo[f]coumarin, 7-diethylamino-3-thienoylcoumarin, 3-(4-cyanobenzoyl)-5,7-dimethoxycoumarin;

4. 3-(Aroylmethylene)-thiazolines

3-Methyl-2-benzoylmethylene-β-naphthothiazoline, 3-methyl-2-benzoylmethylene-benzothiazoline, 3-ethyl-2-propionylmethylene-β-naphthothiazoline;

5. Other Carbonyl Compounds

Acetophenone, 3-methoxyacetophenone, 4-phenylacetophenone, benzil, 2-acetylnaphthalene, 2-naphthaldehyde, 9,10-anthraquinone, 9-fluorenone, dibenzosuberone, xanthone, 2,5-bis(4-diethylaminobenzylidene)cyclopentanone, α-(para-dimethylamino-benzylidene)ketones, such as 2-(4-dimethylamino-benzylidene)-indan-1-one or 3-(4-dimethylamino-phenyl)-1-indan-5-yl-propenone, 3-phenylthiophthalimide, N-methyl-3,5-di(ethylthio)phthalimide, N-methyl-3,5-di(ethylthio)phthalimide.

The classes of the benzophenones, benzophenone derivatives, thioxanthone, thioxanthone derivatives, acetophenone and acetophenone derivatives are preferred. Some of the compounds of those classes have been mentioned above. They are known to the person skilled in the art and are commercially available.

In addition to those additives, which are important for the curing, the free-radical-curable composition may also comprise further additives, especially light stabilisers.

The radiation-curable compositions may also be pigmented when a suitable photoinitiator is chosen, it being possible for coloured pigments as well as white pigments, dyes and fillers to be used.

The coating can be applied in any layer thicknesses, preferably from about 0.1 μm to about 1000 μm, especially about from 1 μm to 100 μm. In the range of low layer thicknesses <5 μm, pigmented surface-coatings are also referred to as printing inks.

As light stabilisers it is possible to add UV absorbers, e.g. those of the hydroxyphenylbenzotriazole, hydroxyphenylbenzophenone, oxalic acid amide or hydroxyphenyl-s-triazine type. Such compounds can be used on their own or in the form of mixtures, with or without the use of sterically hindered amines (HALS).

Examples of such UV absorbers and light stabilisers are 1. 2-(2'-Hydroxyphenyl)-benzotriazoles, e.g. 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole and 2-(3'-tert-butyl-2'-hydroxy-5'-(2-isooctyloxycarbonylethyl)-phenyl-benzotriazole, 2,2'-methylene-bis[4-(1,1,3,3-tetramethylbutyl)-6-benzotriazol-2-yl-phenol]; transesterification product of 2-[3'-tert-butyl-5'-(2-methoxycarbonylethyl)-2'-hydroxyphenyl]-benzotriazole with polyethylene glycol 300; [R-CH$_2$CH$_2$-COO(CH$_2$)$_3$]$_2$- wherein R=3'-tert-butyl4'-hydroxy-5'-2H-benzotriazol-2-yl-phenyl.

2. 2-Hydroxybenzophenones, e.g. the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivative.

3. Esters of Unsubstituted or Substituted Benzoic Acids, e.g. 4-tert-butyl-phenyl salicylate, phenyl salicylate, octylphenyl salicylate, dibenzoylresorcinol, bis(4-tert-butylbenzoyl)-resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxy-benzoic acid octadecyl ester, 3,5-di-tert-butyl4-hydroxybenzoic acid 2-methyl-4,6-di-tert-butylphenyl ester.

4 Acrylates, e.g. α-cyano-β,β-diphenylacrylic acid ethyl ester or isooctyl ester, α-methoxy-carbonylcinnamic acid methyl ester, α-cyano-β-methyl-p-methoxycinnamic acid methyl ester or butyl ester, α-methoxycarbonyl-p-methoxycinnamic acid methyl ester, N-(β-methoxy-carbonyl-βcyanovinyl)-2-methyl-indoline.

5. Sterically Hindered Amines, e.g. bis(2,2,6,6-tetramethylpiperidyl) sebacate, bis(2,2,6,6-tetramethylpiperidyl) succinate, bis(1,2,2,6,6-pentamethylpiperidyl) sebacate, n-butyl-3,5-di-tert-butyl-4-hydroxybenzylmalonic acid bis(1,2,2,6,6-pentamethylpiperidyl) ester, condensation product of 1-hydroxyethyl-2,2,6,6-tetramethyl-4-hydroxypiperidine and succinic acid, condensation product of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl)-1,2,3,4-butanetetraoate, 1,1'-(1,2-ethane-diyl)bis(3,3,5,5-tetramethylpiperazinone), 4-benzoyl-2,2,6,6-tetramethylpiperidine, 4-stearyl-oxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, condensation product of N,N'-bis(2,2,6,6-tetramethyl-4-piperidyl)-hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione.

6. Oxalic Acid Diamides, e.g. 4,4'-dioctyloxy oxanilide, 2,2'-diethoxy oxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl) oxalamide, 2-ethoxy-5-tert-butyl-2'-ethyl oxanilide and a mixture thereof with 2-ethoxy-2'-ethyl-5,4'-di-tert-butyl oxanilide, mixtures of o- and p-methoxy- and also of o- and p-ethoxy-di-substituted oxanilides.

7.2-(2-Hydroxyphenyl)-1,3,5-triazines, e.g. 2,4,6-tris(2-hydroxy-4-octyloxyphenyl)-1,3,5-triazine, 2-(2-hydroxy-4-octyloxyphenyl)4,6-bis(2,4-dimethylphenyl)-1,3,5-triazine, 2-(2,4-dihydroxyphenyl)4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropyloxy)phenyl]4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy/tridecyloxy-2-hydroxypropyl)oxy-2-hydroxyphenyl]-4,6-bis(2,4-dimethylphenyl)-1,3,5-triazine.

In addition to the light stabilisers mentioned above, other stabilisers, such as phosphites or phosphonites, are also suitable.

8. Phosphites and Phosphonites, e.g. triphenyl phosphite, diphenylalkyl phosphites, phenyldialkyl phosphites, tris (nonylphenyl)phosphite, trilauryl phosphite, trioctadecyl phosphite, distearyl-pentaerythritol diphosphite, tris(2,4-di-tert-butylphenyl)phosphite, diisodecylpenta-erythritol diphosphite, bis(2,4-di-tert-butylphenyl)pentaerythritol diphosphite, bis(2,6-di-tert-butyl-4-methylphenyl) pentaerythritol diphosphite, bis-isodecyloxy-pentaerythritol diphosphite, bis(2,4-di-tert-butyl-6-methylphenyl) pentaerythritol diphosphite, bis(2,4,6-tri-tert-butylphenyl)-pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite.

It is also possible to use additives customary in the art, e.g. antistatics, flow improvers and adhesion promoters.

Process step a) is preferably carried out with a low-temperature plasma discharge.

The process can be carried out within a wide pressure range; as pressure increases the discharge characteristics shift from pure low-temperature plasma towards corona discharge and ultimately at atmospheric pressure of about 1000–1100 mbar change into a pure corona discharge.

The process is preferably carried out at a process pressure of from $10^{-6}$ mbar up to atmospheric pressure (1013 mbar), especially in the range from $10^{-4}$ to $10^{-2}$ mbar as a plasma process and at atmospheric pressure as a corona process.

The process is preferably carried out by using as plasma gas an inert gas or a mixture of an inert gas with a reactive gas.

It is especially preferable to use as plasma gases He, Ar, Kr, Xe, $N_2$, $O_2$ or $H_2O$ on their own or in the form of a mixture.

The temperature at which an electron- or H-donor, e.g. an amine, a thiol or a thioether or a mixture thereof, each containing at least one ethylenically unsaturated group, is vaporised in vacuo is preferably from 20° C. to 250° C., especially from 40° C. to 150° C.

The deposited layer of electron- or H-donor preferably has a thickness ranging from a monomolecular layer up to 100 nm, especially from 10 nm to 60 nm.

The plasma treatment of the inorganic or organic substrate a) is preferably carried out for from 1 s to 300 s, especially from 10 s to 200 s.

The deposition of the electron- or H-donor in Process step b) is carried out in vacuo preferably for from 1 s to 100 minutes.

When a corona discharge is carried out, a solution or melt of the electron- or H-donor is preferably applied by spraying immediately after the discharge zone. The corona discharge can also be carried out under a protective gas atmosphere.

When the substrate has been pretreated with a plasma or corona discharge or by irradiation with high-energy radiation, the further processing time depends upon the lifespan of the resulting free radicals on the surface. In principle, it is advantageous to apply the electron- or H-donor as quickly as possible, since at the beginning a high number of reactive free radicals are present on the surface for the grafting reaction. For many purposes, however, it can also be acceptable to carry out Reaction step b) after a time delay, but it is preferable to carry out Process step b) immediately after, or within 10 hours of, Process step a).

The invention relates also to the use of at least one electron- or H-donor, each containing at least one ethylenically unsaturated group, in the production of strongly adherent coatings on an inorganic or organic substrate, in which process in a first step a) the inorganic or organic substrate is subjected to the action of a low-temperature plasma discharge, a corona discharge, high-energy UV radiation or electron radiation, the radiation or discharge is then discontinued, in a further step b) one or more electron-donors as coinitiators, containing at least one ethylenically unsaturated group, are applied to the inorganic or organic substrate in vacuo or at normal pressure and reacted with the free radical sites formed there, and c1) the substrate so precoated with coinitiator is coated with a composition comprising at least one ethylenically unsaturated monomer or oligomer and a photoinitiator, and the coating is cured by means of electromagnetic and/or ionising radiation; or c2) the substrate so precoated with coinitiator is coated with a composition comprising at least one ethylenically unsaturated monomer or oligomer and one or more thermally activatable initiators, and the coating is cured thermally.

The invention relates also to strongly adherent coatings, obtainable in accordance with the process described above.

Such strongly adherent coatings are important both as protective layers or coverings (it being possible for such coatings additionally to be pigmented) and as image-forming coatings, e.g. in resist technology.

The following Examples illustrate the invention.

EXAMPLE 1

PE Film

The plasma treatment is carried out in a commercially available parallel plate reactor at 40 kHz, 30 W. An approximately 50 μm thick commercially available PE film is used as substrate. The substrate is exposed to an argon/$O_2$ plasma (75/25) at $3 \times 10^{-2}$ mbar for 10 seconds. The plasma is discontinued and the pressure is reduced to $2 \times 10^{-4}$ mbar. Then the 2-N-morpholinoethyl acrylate, which has been introduced into a reservoir flange-mounted on the plasma chamber, is transferred to the reactor, that being achieved using a metering needle valve. The pressure is then set to $5 \times 10^{-4}$ mbar. The plasma-activated substrate is exposed to the resulting monomer vapour for 10 minutes, a layer thickness of about 30 nm being achieved. The thickness is measured using a commercially available quartz oscillator.

The substrate so precoated is divided into pieces and coated with three radiation-curable epoxyacrylate compositions, consisting of a standard basic formulation of 89% Ebecryl® 604 (UCB), 10% SR® 344 (Sartomer), 1% Ebecryl® 350 (UCB) and the appropriate photoinitiator.

The following photoinitiator systems are used:
Formulation A: 2% Darocur® 1173 (Ciba Spezialitätenchemie)
Formulation B: 2% isopropylthioxanthone (ITX)/2% N-methyldimethanolamine (NMDEA)
Formulation C: 2% benzophenone (BP)/2% NMDEA For comparison purposes, samples that have not been pretreated are likewise coated with formulations A–C.
The coated samples are cured in an AETEK processor having two 80W/cm medium-pressure mercury lamps at a belt speed of 10 m/min.

The adhesive strength is determined by tearing an adhesive tape off the test films and by mechanically stressing the test films by folding.

The result is shown in Table 1.

TABLE 1

| Formulation | pretreated with plasma, according to the invention | without plasma treatment, comparison test |
| --- | --- | --- |
| No. A | no detachment when the adhesive tape is torn off or in the bending test | completely detached when the adhesive tape is torn off and in the bending test |
| No. B | no detachment when the adhesive tape is torn off or in the bending test | partly detached when the adhesive tape is torn off and in the bending test |
| No. C | no detachment when the adhesive tape is torn off or in the bending test | completely detached when the adhesive tape is torn off and in the bending test |

EXAMPLE 2

PP Film

The same procedure of pretreatment and coating application is carried out on an approximately 50 μm thick commercially available PP film. The result is shown in Table 2.

TABLE 2

| Formulation | pretreated with plasma, according to the invention | without plasma treatment, comparison test |
| --- | --- | --- |
| No. A | no detachment when the adhesive tape is torn off or in the bending test | completely detached when the adhesive tape is torn off and in the bending test |
| No. B | no detachment when the adhesive tape is torn off or in the bending test | partly detached when the adhesive tape is torn off and in the bending test |
| No. C | no detachment when the adhesive tape is torn off or in the bending test | completely detached when the adhesive tape is torn off and in the bending test |

EXAMPLE 3

PE Film

In a plasma apparatus (GIR 300 from Alcatel), approximately 50 μm thick PE films are treated in a parallel plate reactor at 13.56 MHz and a variable output of from 10 to 100 W. For that purpose, the plasma chamber is evacuated to a pressure of $1-5 \times 10^{-4}$ mbar. The substrates are exposed on the cathode to an Ar/air plasma (50/50) at a pressure of $5 \times 10^{-2}$ mbar for 1–60 seconds. The aminoacrylate Ebecryl® P115 (UCB Chemicals) is then vaporised at 50–60° C. for from 10 to 60 seconds from a heatable crucible which during the plasma treatment is closed by a movable cover and is at room temperature. When the vapour-deposition is complete, air is admitted. The vapour-deposited samples are coated using a wire applicator (24 μm, Erichsen) with a UV-curable coating of the following composition:

87 parts Ebecryl® 604 (UCB)
10 parts SR 344 (Sartomer)
1 part Ebecryl® 350 (UCB)
2 parts Darocur® 1173 (Ciba Spezialitätenchemie).

The coated samples are irradiated in a UV processor (Fusion Systems) with a microwave-excited Hg lamp (type H) and an output of 120 W/cm at a belt speed of 10 m/min.

The adhesive strength is determined by mechanically stressing the films by folding and by tearing an adhesive tape off the films. The results are given in Table 3.

TABLE 3

| | Plasma | | Vaporisation | | Result | |
| --- | --- | --- | --- | --- | --- | --- |
| Sample | Output W | Time s | Temperature ° C. | Time s | Adhesive tape tear-off test | Mechanical stress |
| 1 | 0 | 0 | 0 | 0 | complete detachment | complete detachment |
| 2 | 0 | 0 | 60 | 10 | complete detachment | complete detachment |
| 3 | 60 | 10 | 0 | 0 | partial detachment | partial detachment |
| 4 | 60 | 10 | 60 | 10 | no detachment | no detachment |
| 5 | 100 | 10 | 60 | 10 | partial detachment | partial detachment |
| 6 | 30 | 10 | 60 | 10 | no detachment | no detachment |

Pieces of samples 3 and 4 are boiled in deionised water for 10 minutes. In the case of sample 3 the coating becomes detached, but in the case of sample 4 it remains adherent.

Two pieces of each of samples 1 and 4 are placed one on top of the other prior to irradiation in such a manner that the UV-curable formulation between the films is able to act as adhesive. The resulting laminates are irradiated in the same manner as that described above. In the case of sample 1, the two films can be separated without difficulty. In the case of sample 4, the two films remain firmly stuck together and can be separated only by applying force, which results in the adhesive layer being destroyed.

EXAMPLE 4

PE Film

PE films are treated analogously to Example 3, but this time vapour-deposition is carried out with CN 386 (Sartomer). The results are given in Table 4.

TABLE 4

| Sample | Plasma Output W | Time s | Vaporisation Temperature °C | Time s | Result Adhesive tape tear-off test | Mechanical stress |
|---|---|---|---|---|---|---|
| 7 | 0 | 0 | 0 | 0 | complete detachment | complete detachment |
| 8 | 30 | 10 | 20 | 10 | no detachment | no detachment |
| 9 | 60 | 10 | 5 | 10 | no detachment | no detachment |
| 10 | 60 | 10 | 5 | 60 | no detachment | no detachment |

EXAMPLE 5

PE Film

PE films are treated analogously to Example 3, but this time vapour-deposition is carried out with morpholinoethyl methacrylate (Polyscience). The results are given in Table 5.

TABLE 5

| Sample | Plasma Output W | Time s | Vaporisation Temperature °C | Time s | Result Adhesive tape tear-off test | Mechanical stress |
|---|---|---|---|---|---|---|
| 11 | 0 | 0 | 0 | 0 | complete detachment | complete detachment |
| 12 | 60 | 10 | 5 | 10 | no detachment | no detachment |

EXAMPLE 6

Mylar Film

Analogously to Example 3, Mylar® films (Mylar D, biaxially stretched) having a thickness of 175 μm are treated with Ebecryl® P115 and tested. The results are given in Table 6.

TABLE 6

| Sample | Plasma Output W | Time s | Vaporisation Temperature °C | Time s | Result Adhesive tape tear-off test | Mechanical stress |
|---|---|---|---|---|---|---|
| 13 | 0 | 0 | 0 | 0 | complete detachment | complete detachment |
| 14 | 60 | 10 | 0 | 0 | detachment | detachment |
| 15 | 60 | 10 | 60 | 10 | no detachment | no detachment, Mylar breaks |

EXAMPLE 7

PE Film

The procedure is analogous to Example 3 and PE film is used as substrate, but an Ar/oxygen plasma (75/25) is used and the UV-curable formulation contains 0.5 part of Speedcure® ITX (Rahn). Ebecryl® P115 is vaporised. The results are given in Table 7.

TABLE 7

| Sample | Plasma Output W | Time s | Vaporisation Temperature °C | Time s | Result Adhesive tape tear-off test | Mechanical stress |
|---|---|---|---|---|---|---|
| 16 | 0 | 0 | 0 | 0 | complete detachment | complete detachment |
| 17 | 30 | 10 | 0 | 0 | detachment | detachment |
| 18 | 30 | 10 | 60 | 10 | no detachment | no detachment |

In addition, the irradiated samples are treated with acetone. In the case of samples 16 and 17, the cured film-coating can be washed off, while in the case of sample 18 it remains adhering to the film.

EXAMPLE 8

Rubber

The procedure is analogous to Example 3 and a carbon-black-filled rubber is used as substrate. An Ar/oxygen plasma (75/25) is used and the UV-curable formulation contains 2 parts Darocur® 1173. Ebecryl® P115 is vaporised. The results are given in Table 8.

TABLE 8

| Sample | Plasma Output W | Time s | Vaporisation Temperature °C | Time s | Result Adhesive tape tear-off test | Mechanical stress |
|---|---|---|---|---|---|---|
| 19 | 0 | 0 | 0 | 0 | complete detachment | complete detachment |
| 20 | 30 | 10 | 0 | 0 | detachment | detachment |
| 21 | 30 | 10 | 60 | 10 | hardly any detachment | hardly any detachment |

EXAMPLE 9

PE Film

The procedure is analogous to Example 3 and PE film is used as substrate, but an Ar/oxygen plasma (75/25) is used and Ebecryl® P115 is vaporised. As the UV-curable formulation there is used a blue flexo-printing ink consisting of the following components:

| Weight [g] | Product |
|---|---|
| 26.9 | IRR 440[1], |
| 19.0 | OTA 480 [1], |
| 18.0 | Ebecryl ® 645[1], |
| 13.0 | Hexanediol diacrylate[1], |
| 10.0 | Ebecryl ® 220[1], |
| 1.3 | Ebecryl ® 168[1], |

-continued

| Weight [g] | Product |
|---|---|
| 0.7 | DC 57[2], |
| 11.1 | Irgalit ® blue LGK[3] |

[1]UCB
[2]Dow Corning
[3]Ciba Spezialitätenchemie

The ink is applied with a 12 μm spiral applicator and the irradiation is carried out at a belt speed of 10 m/min. The results are shown in Table 9.

TABLE 9

| Sample | Plasma Output W | Plasma Time s | Vaporisation Temperature °C. | Vaporisation Time s | Result Adhesive tape tear-off test | Result Mechanical stress |
|---|---|---|---|---|---|---|
| 16 | 0 | 0 | 0 | 0 | complete detachment | complete detachment |
| 17 | 30 | 10 | 0 | 0 | detachment | detachment |
| 18 | 30 | 10 | 60 | 10 | detachment | no detachment |

EXAMPLE 10

PTFE Film

The procedure is analogous to Example 3, but a PTFE film is used as substrate and an Ar/oxygen plasma (75/25) is used. Ebecryl® P115 is vaporised. The blue flexo-printing ink from example 9 is used as UV-curable formulation. The ink is applied with a 12 μm spiral applicator and the irradiation is carried out at a belt speed of 10 m/min. The results are shown Table 10.

TABLE 10

| Sample | Plasma Output W | Plasma Time s | Vaporisation Temperature °C. | Vaporisation Time s | Result Adhesive tape tear-off test | Result Mechanical stress |
|---|---|---|---|---|---|---|
| 19 | 0 | 0 | 0 | 0 | complete detachment | complete detachment |
| 20 | 100 | 60 | 0 | 0 | complete detachment | complete detachment |
| 21 | 100 | 60 | 60 | 10 | partial detachment | partial detachment |

EXAMPLE 11

Mylar® Film

The procedure is analogous to Example 3, but a Mylar® film is used as substrate and an Ar/oxygen plasma (75/25) is used. Ebecryl® P115 is vaporised. The blue flexo-printing ink from Example 9 is used as UV-curable formulation. The ink is applied with a 12 μm spiral applicator and the irradiation is carried out at a belt speed of 10 m/min. The results are shown in Table 11.

TABLE 11

| Sample | Plasma Output W | Plasma Time s | Vaporisation Temperature °C. | Vaporisation Time s | Result Adhesive tape tear-off test | Result Mechanical stress |
|---|---|---|---|---|---|---|
| 22 | 0 | 0 | 0 | 0 | complete detachment | complete detachment |
| 23 | 50 | 50 | 0 | 0 | partial detachment | partial detachment |
| 24 | 50 | 50 | 60 | 10 | slight detachment | slight detachment |

EXAMPLE 12

PP Film

The procedure is analogous to Example 3, but a 15 μm biaxially stretched polypropylene film is used as substrate and an Ar/air plasma (50/50) is used. Acryloylmorpholine is vaporised. The blue flexo-printing ink from Example 9 is used as UV-curable formulation. The ink is applied with a 12 μm spiral applicator and the irradiation is carried out at a belt speed of 25 m/min. Further mechanical tests are not possible because of the low film thickness of the ink The results are shown in Table 12.

TABLE 12

| Sample | Plasma Output W | Plasma Time s | Vaporisation Temperature °C. | Vaporisation Time s | Result Adhesive tape tear-off test |
|---|---|---|---|---|---|
| 25 | 0 | 0 | 0 | 0 | complete detachment |
| 26 | 30 | 5 | 0 | 0 | partial detachment |
| 27 | 30 | 5 | 5 | 10 | slight detachment |

EXAMPLE 13

PP Film

The procedure is analogous to Example 3, but a 15 μm biaxially stretched polypropylene film is used as substrate and an Ar/air plasma (50/50) is used. Acryloylmorpholine is vaporised. The formulation from Example 3 is used as UV-curable formulation. Two pieces of each of samples 1 and 4 are placed one on top of the other prior to irradiation in such a manner that the UV-curable formulation between the films is able to act as adhesive. Tests are carried out to discover how well the two strips adhere to one another after irradiation. The results are given in Table 13.

TABLE 13

| | Plasma | | Vaporisation | | Result |
|---|---|---|---|---|---|
| Sample | Output W | Time s | Temperature °C. | Time s | Adhesive action |
| 28 | 0 | 0 | 0 | 0 | No adhesion |
| 29 | 30 | 5 | 0 | 0 | Better adhesion, but films can readily be separated |
| 30 | 30 | 5 | 5 | 10 | Very good adhesion, PP film tears |

EXAMPLE 14

PP Film

The procedure is analogous to Example 13, but Actilane 705 is vaporised. The formulation from Example 3 is used as UV-curable formulation. Two pieces of each of samples 1 and 4 are placed one on top of the other prior to irradiation in such a manner that the UV-curable formulation between the films is able to act as adhesive Tests are carried out to discover how well the two strips adhere to one another after irradiation. The results are given in Table 14.

TABLE 14

| | Plasma | | Vaporisation | | Result |
|---|---|---|---|---|---|
| Sample | Output W | Time s | Temperature °C. | Time s | Adhesive action |
| 28 | 0 | 0 | 0 | 0 | No adhesion |
| 29 | 30 | 5 | 0 | 0 | Better adhesion, but films can readily be separated |
| 30 | 30 | 5 | 60 | 10 | Very good adhesion, PP film tears |

EXAMPLE 15

PP Film

The procedure is analogous to Example 3, but a 15 µm biaxially stretched polypropylene film is used as substrate and Ar/air plasmas of different compositions are applied for 5 seconds at 30 W. Ebecryl® P 115 is vaporised. The blue flexo-printing ink from Example 9 is used as UV-curable formulation. The ink is applied with a 6 µm spiral applicator and the irradiation is carried out at a belt speed of 25 m/min. The results are shown in Table 15.

TABLE 15

| | Plasma | | Vaporisation | | Result |
|---|---|---|---|---|---|
| Sample | Argon sscm | Air sscm | Temperature °C. | Time s | Adhesive tape tear-off test |
| 31 | 0 | 0 | 0 | 0 | complete detachment |
| 32 | 30 | 30 | 60 | 10 | partial detachment |
| 33 | 30 | 10 | 0 | 0 | partial detachment |
| 34 | 30 | 10 | 60 | 10 | slight detachment, PP film tears |
| 35 | 30 | 0 | 0 | 0 | detachment and ink residues on the film |
| 36 | 30 | 0 | 60 | 10 | slight detachment, PP film tears |

EXAMPLE 16

PP Film

The procedure is analogous to Example 3, but a 15 µm biaxially stretched polypropylene film is used as substrate and a pure Ar plasma is used. Actilane® 715 is vaporised. The blue flexo-printing ink from Example 9 is used as UV-curable formulation. The ink is applied with a 6 µm spiral applicator and the irradiation is carried out at a belt speed of 25 m/min. The results are shown in Table 16.

TABLE 16

| | Plasma | | Vaporisation | | Result |
|---|---|---|---|---|---|
| Sample | Output W | Time s | Temperature °C. | Time s | Adhesive tape tear-off test |
| 37 | 0 | 0 | 0 | 0 | complete detachment |
| 38 | 30 | 5 | 0 | 0 | partial detachment |
| 39 | 30 | 5 | 60 | 10 | slight detachment, PP film tears |

EXAMPLE 17

PP Film

The procedure is analogous to Example 3, but a 15 µm biaxially stretched polypropylene film is used as substrate and a pure Ar plasma is used. Photomer® 4967 is vaporised. The blue flexo-printing ink from Example 9 is used as UV-curable formulation. The ink is applied with a 6 µm spiral applicator and the irradiation is carried out at a belt speed of 25 m/min. The results are shown in Table 17.

TABLE 17

| | Plasma | | Vaporisation | | Result |
|---|---|---|---|---|---|
| Sample | Output W | Time s | Temperature °C. | Time s | Adhesive tape tear-off test |
| 40 | 0 | 0 | 0 | 0 | complete detachment |
| 41 | 30 | 5 | 0 | 0 | partial detachment |

TABLE 17-continued

| | Plasma | | Vaporisation Temperature | | Result Adhesive tape |
|---|---|---|---|---|---|
| Sample | Output W | Time s | ° C. | Time s | tear-off test |
| 42 | 30 | 5 | 60 | 10 | slight detachment, PP film tears |

What is claimed is:

1. A process for the production of strongly adherent coatings on an inorganic or organic substrate, in which process In a first step a) the inorganic or organic substrate is subjected to the action of a low-temperature plasma discharge, a corona discharge, high-energy UV radiation or electron radiation, the radiation or discharge is then discontinued, in a further step b) at least one electron- or H-donor compound, selected from the group consisting of amines, thiols and thioethers, each containing at least one ethylenically unsaturated group, is applied to the inorganic or organic substrate in vacuo or at normal pressure and reacted with the free radicals formed there in step a) to precoat the substrate with a coinitiator, and c1) the substrate so precoated with coinitiator is coated with a composition comprising at least one ethylenically unsaturated monomer or oligomer and a photoinitiator, and the coating is cured by means of electromagnetic and/or ionising radiation; or c2) the substrate so precoated with coinitiator is coated with a composition comprising at least one ethylenically unsaturated monomer or oligomer and one or more thermally activatable initiators, and the coating is cured thermally.

2. A process according to claim 1, wherein the inorganic or organic substrate is in the form of a powder, a fibre, a film or a three-dimensional workpiece.

3. A process according to claim 1, wherein the inorganic or organic substrate is a thermoplastic, elastomeric, structurally crosslinked or crosslinked polymer, a metal oxide, a glass or a metal.

4. A process according to claim 1, wherein the electron- or H-donor is a primary, secondary or tertiary amine, a thiol or a thioether or a mixture thereof.

5. A process according to claim 1, wherein the amine, thiol or thioether is a compound of formula Ia, Ib, Ic, Id or Ie,

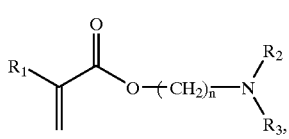 (Ia)

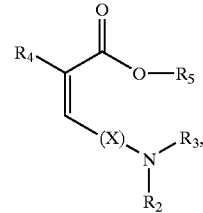 (Ib)

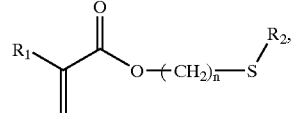 (Ic)

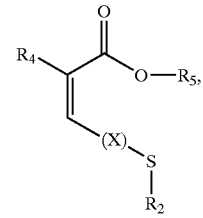 (Id)

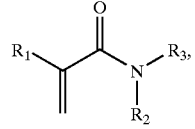 (Ie)

wherein $R_1$ is H or $C_1$–$C_4$alkyl;

$R_2$ and $R_3$ are each independently of the other $C_1$–$C_{18}$alkyl or, in formulae Ia, Ib and Ie, together with the nitrogen atom to which they are bonded form a 5- or 6-membered cycloaliphatic ring which may additionally be interrupted by a nitrogen or oxygen atom; or $R_2$ in formula Ic has the additional meaning of the group

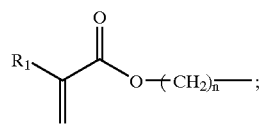

$R_4$ is $C_1$–$C_{18}$alkyl, phenyl, phenyl-$C_1$–$C_3$alkyl or a group —C(O)—$C_1$–$C_{18}$alkyl or —C(O)—$(CH_2)_a$-phenyl wherein a is a number from 0 to 3;

$R_5$ is $C_1$–$C_{18}$alkyl, phenyl or phenyl-$C_1$–$C_3$alkyl;

X is a direct bond, a group —$(CH_2)_n$— or a branched $C_3$–$C_{18}$alkylene group; and n is a number from 1 to 12.

6. A process according to claim 1, wherein, in Process step b), together with the electron- or H-donors having at least one ethylenically unsaturated group there is simultaneously applied a photoinitiator and/or an ethylenically unsaturated monomer.

7. A process according to claim 1, wherein at least one of the ethylenically unsaturated monomers or oligomers of the composition is a mono-, di-, tri- or tetra-functional acrylate or methacrylate.

8. A process according to claim 1, wherein the free-radical-curable composition according to Process step c1) comprises a photoinitiator and is cured by UV/VIS radiation.

9. A process according to claim 1, wherein the process pressure for the plasma treatment is from $10^{-6}$ mbar up to atmospheric pressure.

10. A process according to claim 1, wherein an inert gas or a mixture of an inert gas with a reactive gas is used as plasma gas.

11. A process according to claim 9, wherein $N_2$, He, Ar, Kr, Xe, $O_2$ or $H_2O$ on their own or in the form of a mixture are used.

12. A process according to claim 1, wherein the temperature at which an electron- or H-donor, each containing at least one ethylenically unsaturated group, is vaporised is from 20° C. to 250° C.

13. A process according to claim 1, wherein the deposited layer of electron- or H-donor has a thickness from a monomolecular layer up to 100 nm.

14. A process according to claim 1, wherein the plasma treatment a) is carried out for from 1 s to 300 s.

15. A process according to claim 1, wherein the deposition of the electron- or H-donor b) is carried out for from 1 s to 100 minutes.

16. A strongly adherent coating, obtainable by a process according to claim 1.

* * * * *